(12) United States Patent
Yun et al.

(10) Patent No.: US 9,803,580 B2
(45) Date of Patent: Oct. 31, 2017

(54) METHOD AND APPARATUS FOR CONTROLLING OPERATION OF AN INTERNAL COMBUSTION ENGINE

(71) Applicant: GM GLOBAL TECHNOLOGY OPERATIONS LLC, Detroit, MI (US)

(72) Inventors: Hanho Yun, Oakland Township, MI (US); Jun-Mo Kang, Ann Arbor, MI (US); Orgun A. Guralp, Ann Arbor, MI (US); Chen-Fang Chang, Troy, MI (US); Paul M. Najt, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 265 days.

(21) Appl. No.: 14/333,247

(22) Filed: Jul. 16, 2014

(65) Prior Publication Data

US 2016/0017834 A1 Jan. 21, 2016

(51) Int. Cl.
| | | |
|---|---|---|
| *F02B 17/00* | (2006.01) | |
| *F02D 41/30* | (2006.01) | |
| *F02P 5/04* | (2006.01) | |
| *F02D 41/34* | (2006.01) | |
| *F02P 5/15* | (2006.01) | |
| *F02D 35/02* | (2006.01) | |

(52) U.S. Cl.
CPC ....... *F02D 41/3041* (2013.01); *F02D 35/023* (2013.01); *F02D 41/34* (2013.01); *F02P 5/045* (2013.01); *F02P 5/1512* (2013.01); *F02D 35/028* (2013.01); *Y02T 10/128* (2013.01); *Y02T 10/44* (2013.01); *Y02T 10/46* (2013.01)

(58) Field of Classification Search
CPC ... Y02T 10/128; Y02T 10/47; F02D 41/3041; F02D 41/34; F02D 41/3035; F02D 35/023; F02D 13/0265; F02D 41/402; F02D 13/0261; F02P 5/045; F02P 5/1512; F02P 15/08; F02B 1/12; F02B 2075/125; F02B 3/06
USPC .... 123/90.15, 299, 300, 305, 636, 637, 638, 123/435; 73/114.16, 114.17
See application file for complete search history.

(56) References Cited

U.S. PATENT DOCUMENTS

| | | | | |
|---|---|---|---|---|
| 2006/0243241 | A1* | 11/2006 | Kuo | F01L 13/00 123/295 |
| 2009/0272363 | A1* | 11/2009 | Yun | F02B 1/12 123/295 |
| 2009/0312941 | A1* | 12/2009 | Wang | F02D 35/023 701/114 |

(Continued)

FOREIGN PATENT DOCUMENTS

| | | |
|---|---|---|
| CN | 1877097 A | 12/2006 |
| CN | 101915175 A | 12/2010 |

*Primary Examiner* — Hai Huynh
*Assistant Examiner* — Gonzalo Laguarda

(57) ABSTRACT

An internal combustion engine is configured to operate in a homogeneous-charge compression-ignition combustion mode. Operation of the engine includes determining a combustion pressure parameter for each cylinder. Fueling for each cylinder is controlled responsive to a target state for the combustion pressure parameter for the corresponding cylinder. An end-of-injection timing and a corresponding spark ignition timing for each cylinder are controlled responsive to a target mass-burn-fraction point for an engine operating point.

15 Claims, 6 Drawing Sheets

(56) References Cited

U.S. PATENT DOCUMENTS

| | | | |
|---|---|---|---|
| 2010/0037858 A1* | 2/2010 | Kang | F02D 35/023 123/406.23 |
| 2010/0186391 A1* | 7/2010 | Najt | B01D 53/8696 60/295 |
| 2010/0222985 A1* | 9/2010 | Yun | F02D 37/02 701/103 |

* cited by examiner

METHOD AND APPARATUS FOR CONTROLLING OPERATION OF AN INTERNAL COMBUSTION ENGINE

TECHNICAL FIELD

This disclosure relates to an internal combustion engine configured to operate in a homogeneous-charge compression-ignition (HCCI) combustion mode.

BACKGROUND

The statements in this section merely provide background information related to the present disclosure and may not constitute prior art.

Known spark-ignition (SI) engines introduce an air/fuel mixture into each cylinder that is compressed in a compression stroke and ignited by a spark plug. Known compression-ignition (CI) engines inject pressurized fuel into a combustion cylinder near top dead center (TDC) of the compression stroke that ignites upon injection. Combustion for both SI engines and CI engines involves premixed or diffusion flames controlled by fluid mechanics.

SI engines may operate in different combustion modes, including a homogeneous SI combustion mode and a stratified-charge SI combustion mode. SI engines may be configured to operate in a homogeneous-charge compression-ignition (HCCI) combustion mode, also referred to as controlled auto-ignition combustion, under predetermined speed/load operating conditions. HCCI combustion is a distributed, flameless, kinetically-controlled auto-ignition combustion process with the engine operating at a dilute air/fuel mixture, i.e., lean of a stoichiometric air/fuel point, with relatively low peak combustion temperatures, resulting in low NOx emissions. An engine operating in the HCCI combustion mode forms a cylinder charge that is preferably homogeneous in composition, temperature, and residual exhaust gases at intake valve closing time. The homogeneous air/fuel mixture minimizes occurrences of rich in-cylinder combustion zones that form smoke and particulate emissions.

Engine airflow may be controlled by selectively adjusting position of the throttle valve and adjusting opening and closing of intake valves and exhaust valves. On engine systems so equipped, opening and closing of the intake valves and exhaust valves may be adjusted using a variable valve actuation system that includes variable cam phasing and a selectable multi-step valve lift, e.g., multiple-step cam lobes that provide two or more valve lift positions. In contrast to the throttle position change, the change in valve position of the multi-step valve lift mechanism is a discrete step change.

When an engine operates in a HCCI combustion mode, the engine operates at a lean or stoichiometric air/fuel ratio operation with the throttle wide open to minimize engine pumping losses. When the engine operates in the SI combustion mode, the engine operates at or near stoichiometric air/fuel ratio, with the throttle valve controlled over a range of positions from 0% to 100% of the wide-open position to control intake airflow to achieve the stoichiometric air/fuel ratio. An engine operating in the HCCI combustion mode has improved fuel efficiency when compared to operation in the SI combustion mode due to operating at a lean air/fuel ratio with high EGR dilution in an un-throttled state resulting in relatively low combustion temperatures. The improved fuel efficiency is due to thermodynamically more efficient operating cycle, lower pumping losses, and reduced cycle heat loss.

Combustion during engine operation in the HCCI combustion mode is affected by cylinder charge gas temperature before and during compression prior to ignition and by mixture composition of a cylinder charge. Known engines operating in HCCI combustion modes account for variations in ambient and engine operating conditions using calibration tables as part of an overall engine control scheme. Known HCCI engine control routines include calibrations for controlling engine parameters using input parameters including, e.g., engine load, engine speed and engine coolant temperature. Cylinder charge gas temperatures may be affected by controlling hot gas residuals via engine valve overlap and controlling cold gas residuals via exhaust gas recirculation. Cylinder charge gas temperatures, pressure, composition may be influenced by engine environment factors including, e.g., air temperature, humidity and altitude, and fuel parameters including, e.g., RVP, energy content and quality.

Combustion during engine operation in the HCCI combustion mode may be characterized in terms of combustion heat release, which may include combustion timing relative to piston position. Combustion timing may be described in terms of a mass-burn-fraction point, which indicates a piston position at which a portion of the mass fraction of a cylinder charge is burned. A mass-burn-fraction point of interest includes a CA50 point (in crank angle relative to TDC) at which an accumulated heat release reaches 50% of a total heat release of a cylinder charge. Known control systems control combustion timing using feedback control algorithms to compensate for a plurality of effects of environmental and ambient parameters on combustion timing and air/fuel ratio. Alternatively, complex multidimensional calibration tables may be used to account for all the engine environment factors.

SUMMARY

An internal combustion engine is configured to operate in a homogeneous-charge compression-ignition combustion mode. Operation of the engine includes determining a combustion pressure parameter for each cylinder. Fueling for each cylinder is controlled responsive to a target state for the combustion pressure parameter for the corresponding cylinder. An end-of-injection timing and a corresponding spark ignition timing for each cylinder are controlled responsive to a target mass-burn-fraction point for an engine operating point.

BRIEF DESCRIPTION OF THE DRAWINGS

One or more embodiments will now be described, by way of example, with reference to the accompanying drawings, in which:

FIGS. 3-1 through 3-5 illustrate combustion parameters associated with operating an exemplary four-cylinder internal combustion engine operating in a mixed combustion mode, in accordance with the disclosure;

FIGS. 4-1 and 4-2 illustrates interrelations of the data of FIGS. 3-1 through 3-5, in accordance with the disclosure;

FIG. 5 illustrates a combustion stability control routine for controlling operation of a multi-cylinder internal combustion engine to achieve combustion stability during operation, including operation in the mixed combustion mode at low load conditions, in accordance with the disclosure;

DETAILED DESCRIPTION

Figure 1:
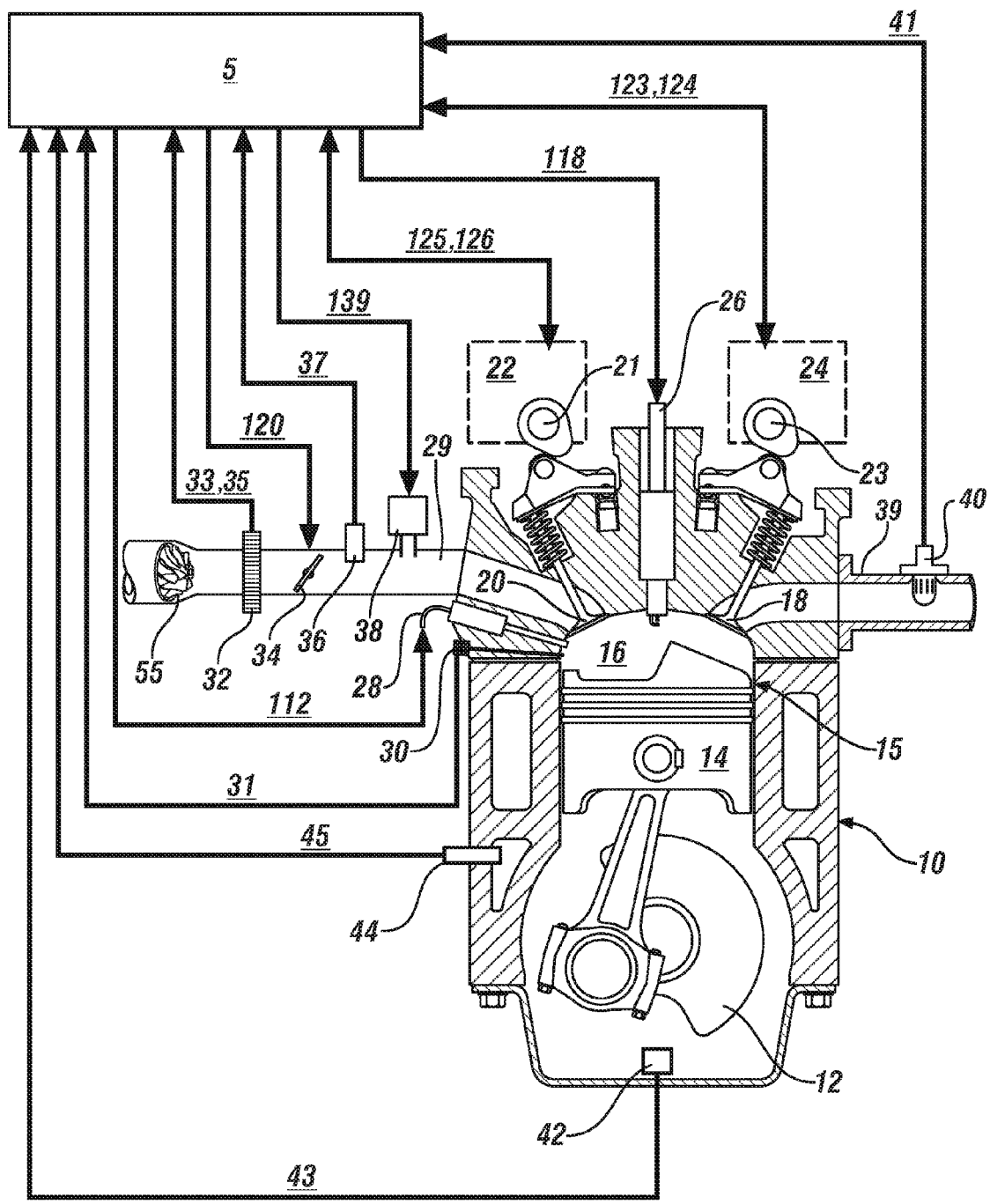
FIG. 1 illustrates a spark-ignition internal combustion engine configured to operate in various combustion modes and an accompanying controller, in accordance with the present disclosure.

Referring now to the drawings, wherein the depictions are for the purpose of illustrating certain exemplary embodiments only and not for the purpose of limiting the same, FIG. 1 schematically shows a multi-cylinder internal combustion engine (engine) 10 and an accompanying controller 5 that have been constructed in accordance with an embodiment of this disclosure. The engine 10 is configured to operate in one of a plurality of selectable combustion modes, including a homogeneous-charge compression-ignition (HCCI) combustion mode, a spark-ignition (SI) combustion mode, and a mixed combustion mode. The engine 10 is configured to operate at a stoichiometric air/fuel ratio and at an air/fuel ratio that is primarily lean of stoichiometry. The disclosure may be applied to various internal combustion engine systems and combustion cycles.

The exemplary engine 10 includes a multi-cylinder direct-injection four-stroke internal combustion engine having reciprocating pistons 14 slidably movable in cylinders 15 that define variable volume combustion chambers 16. A single one of the cylinders 15 is shown. Each piston 14 is connected to a rotating crankshaft 12 by which linear reciprocating motion is translated to rotational motion. An air intake system provides intake air to an intake manifold 29 that directs and distributes air into intake runners of the combustion chambers 16. The air intake system has airflow ductwork and devices for monitoring and controlling the air flow. The air intake system may include an intake air compressor 55 in one embodiment, with the air compressor including one of a turbocharger, a supercharger, or an electric-powered air pumping device. The air intake devices preferably include a mass airflow sensor 32 for monitoring mass airflow (MAF) 33 and intake air temperature (IAT) 35. A throttle valve 34 preferably includes an electronically controlled device that is used to control airflow to the engine 10 in response to a control signal (ETC) 120 from the controller 5. A pressure sensor 36 in the intake manifold 29 is configured to monitor manifold absolute pressure (MAP) 37 and barometric pressure. An external flow passage recirculates exhaust gases from engine exhaust to the intake manifold 29, having a flow control valve referred to as an exhaust gas recirculation (EGR) valve 38. The controller 5 controls mass flow of exhaust gas to the intake manifold 29 by controlling opening of the EGR valve 38 via EGR command (EGR) 139.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 may be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 in response to a control signal (iVLC) 125 and variably adjust and control phasing of the intake camshaft 21 for each cylinder 15 in response to a control signal (iVCP) 126. The exhaust VCP/VLC device 24 preferably includes a controllable mechanism operative to variably switch and control valve lift of the exhaust valve(s) 18 in response to a control signal (eVLC) 123 and variably adjust and control phasing of the exhaust camshaft 23 for each cylinder 15 in response to a control signal (eVCP) 124.

The intake and exhaust VCP/VLC devices 22 and 24 each preferably includes a controllable two-step VLC mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing mechanism to control and adjust phasing (i.e., relative timing) of opening and closing of the intake valve(s) 20 and the exhaust valve(s) 18 respectively. Adjusting phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the controller 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, in response to the respective control signals eVLC 123, eVCP 124, iVLC 125, and iVCP 126. In one embodiment the engine 10 is equipped with only intake and exhaust variable cam phasing devices.

The engine 10 employs a direct-injection fuel injection system including a plurality of high-pressure fuel injectors 28 that are configured to directly inject a mass of fuel into the combustion chambers 16 in response to an injector pulsewidth command (INJ_PW) 112 from the controller 5. The fuel injectors 28 are supplied pressurized fuel from a fuel distribution system. The engine 10 employs a spark-ignition system by which spark energy may be provided to a spark plug 26 for igniting or assisting in igniting cylinder charges in each of the combustion chambers 16 in response to a spark command (IGN) 118 from the controller 5.

The engine 10 is equipped with various sensing devices for monitoring engine operation, including a crank sensor 42 having an output indicative of crankshaft rotational position, i.e., crank angle and speed (RPM) 43. A temperature sensor 44 is configured to monitor coolant temperature 45. An in-cylinder combustion sensor 30 is configured to monitor combustion, and is a cylinder pressure sensor operative to monitor in-cylinder pressure 31 in one embodiment. An exhaust gas sensor 40 is configured to monitor an exhaust gas parameter 41, e.g., actual air/fuel ratio (AFR). The combustion pressure 31 and the RPM 43 are monitored by the controller 5 to determine combustion timing, i.e., timing of combustion pressure relative to the crank angle of the crankshaft 12 for each cylinder 15 for each combustion cycle. It is appreciated that combustion timing may be determined by other methods. The in-cylinder pressure 31 may be monitored by the controller 5 to determine an indicated mean effective pressure (IMEP) for each cylinder 15 for each combustion cycle. Preferably, the engine 10 and controller 5 are configured to monitor and determine states of IMEP for each of the engine cylinders 15 during each cylinder firing event. Alternatively, other sensing systems may be used to monitor states of other combustion parameters within the scope of the disclosure, e.g., ion-sense ignition systems, EGR fractions, and non-intrusive cylinder pressure sensors.

Control module, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The controller has a set of control routines executed to provide the desired functions. Control routines are executed, such as by a central processing unit, and are operable to monitor inputs from sensing devices and other networked controllers, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

In operation, the controller 5 monitors inputs from the aforementioned sensors to determine states of engine parameters. The controller 5 is configured to receive operator commands, e.g., via an accelerator pedal and a brake pedal to determine an operator torque request, from which engine control parameters and an engine torque command are derived. The controller 5 executes control routines stored therein to determine states for the engine control parameters to control the aforementioned actuators to form a cylinder charge, including controlling throttle position, compressor boost, spark-ignition timing, fuel injection pulsewidth affecting injected fuel mass and timing, EGR valve position to control flow of recirculated exhaust gases, and intake and/or exhaust valve timing and phasing. Valve timing and phasing may include negative valve overlap (NVO) and lift of exhaust valve reopening (in an exhaust re-breathing strategy), and positive valve overlap (PVO). Engine parameters associated with a cylinder charge that are affected by individual engine control parameters include as follows: engine mass airflow (MAF) and actual air/fuel ratio, which are controlled by the fuel injection pulsewidth and affects amount of fuel injected for a cylinder event; MAF, which is controlled by controlling NVO/PVO and affects magnitude of residuals in a cylinder; intake oxygen, which is controlled by the EGR valve and affects magnitude of external EGR for a cylinder event; MAP, which is controlled by the ETC and turbocharger (when employed) and affects magnitude of trapped air mass in the cylinder; and mass-burn-fraction point (CA50 point), which is controlled by spark timing and/or timing of pilot fuel injection and affects combustion phasing when operating in the HCCI combustion mode. The engine parameters of MAF, actual air/fuel ratio, intake oxygen, MAP and CA50 point can be directly measured using sensors, inferred from other sensed parameters, estimated, derived from algorithmic models or otherwise determined. The actuators controlling the fuel injection pulsewidth, valve timing and phasing (NVO/PVO) and CA50 point are considered fast actuators because they can implement actuator commands and achieve a preferred operating state to effect a change in engine operation within a single engine cycle. The EGR valve, ETC and turbocharger are considered slow actuators because, although they may implement actuator commands within a single engine cycle, they are unable to achieve a preferred operating state and/or fully effect a change in engine operation until the execution of multiple engine cycles. The effect of a slow actuator upon engine operation is delayed due to system latencies that include communications delays, air, fuel and EGR transport lags, manifold fill times and other factors.

Figure 2:
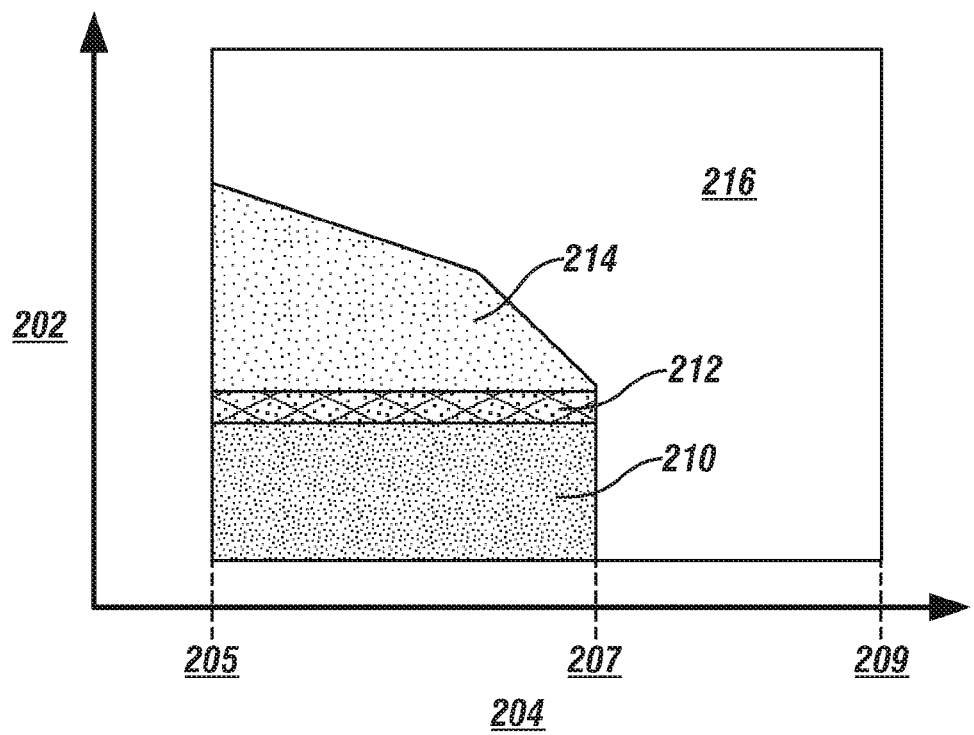
FIG. 2 illustrates preferred combustion modes for operating the internal combustion engine responsive to an engine operating point over a range of engine speeds and a range of loads, in accordance with the disclosure.

FIG. 2 graphically shows preferred combustion modes for operating the engine 10 based upon an engine operating point, depicted over a range of engine speeds (rpm) on the x-axis 204 and a range of engine loads represented in this embodiment by fuel (mg) on the y-axis 202. Engine speeds are circumscribed by idle 205, HCCI combustion mode speed limit 207, and redline 209. The engine 10 operates in one of a spark-ignition (SI) combustion mode 216, an HCCI combustion mode 214, and a mixed combustion mode 210, depending upon the engine speed/load operating point. There can be overlap in operating ranges for the HCCI combustion mode 214 and the mixed combustion mode 210, as shown at region 212 to allow for hysteresis to minimize busyness in transitions between the modes. Each of the combustion modes is associated with a preferred speed/load operating range. The preferred speed/load operating range for each combustion mode can be determined based upon engine operating parameters including combustion stability, fuel consumption, emissions, engine torque output, and others. Boundaries defining the preferred speed/load operating ranges that delineate operation in the aforementioned combustion modes are preferably precalibrated and stored in the controller 5.

Operating the engine 10 in the HCCI combustion mode includes operating the engine 10 with the throttle valve 34 substantially wide-open with the fueling to the engine 10 controlled to achieve a lean air/fuel ratio and sufficient to meet an output torque request. The VCP/VLC devices 22 and 24 are preferably controlled at the low-lift valve open position and at a phasing that achieves a negative valve overlap (NVO) period of a predetermined duration between closing of the exhaust valve(s) 18 and opening of the intake valve(s) 20 causing a recompression period. During the recompression period a high proportion of high temperature residual combustion products are retained from a previous combustion cycle and provide conditions for auto-ignition of the combustion charge in a highly diluted mixture. Preferably there is a single fuel injection event that is timed to occur late the intake stroke and/or early in the compression stroke.

Operating the engine 10 in the spark-ignition (SI) combustion mode includes operating the engine 10 with the throttle valve 34 controlled to regulate the intake air flow with the fueling to the engine 10 controlled to achieve a stoichiometric air/fuel ratio and sufficient to meet an output torque request. The VCP/VLC devices 22 and 24 are preferably controlled at the high-lift valve open position and at phasings that achieve a positive valve overlap between closing of the exhaust valve(s) 18 and opening of the intake valve(s) 20 to retain a small portion of residual combustion products from a previous combustion cycle in the cylinder. The engine 10 operates in the spark-ignition (SI) combustion mode with a controlled throttle operation under conditions not conducive to the HCCI combustion mode operation, and to achieve engine power to meet the output torque request.

Operating the engine 10 in the mixed combustion mode includes operating the engine 10 with the throttle valve 34 wide-open and the intake and exhaust valves controlled to achieve NVO, and executing multiple fueling events and spark ignition events during each combustion event for each cylinder. The VCP/VLC devices 22 and 24 are preferably controlled at the low-lift valve open positions and at phasings that achieve NVO for a predetermined period of duration between closing of the exhaust valve(s) and opening of the intake valve(s) resulting in an exhaust recompression period to effect fuel reforming. The mixed combustion mode preferably includes multiple fuel injection events per cylinder for each combustion cycle and multiple spark ignition events during or immediately subsequent to one or two of the fuel injection events. This includes dividing the total required fuel mass per cycle into at least three fuel injection events including initial, intermediate and final fuel injection events, with the initial fuel injection event associated with fuel reforming and the final fuel injection event associated with an engine power stroke.

The engine 10 is controlled to operate at a preferred air/fuel ratio to achieve preferred performance associated with one or more of the engine operating parameters including combustion stability, fuel consumption, emissions, and engine torque output. This includes estimating a cylinder air charge based upon engine operation in the selected combustion mode. The throttle valve 34 and the VCP/VLC devices 22 and 24 are controlled to achieve an intake air flowrate based upon the estimated cylinder air charge, including during transitions between the combustion modes. Air flow is controlled by adjusting the throttle valve 34 and controlling the VCP/VLC devices 22 and 24 to control the opening timing and profiles of the intake and exhaust valve(s) 20 and 18. Operation in each of the combustion modes can require different settings for the VCP/VLC devices 22 and 24 in terms of valve lift, duration and phasing of the intake and exhaust valve(s) 20 and 18 and opening angle of the throttle valve 34.

Combustion parameters of interest at low load engine operation include air/fuel ratio, IMEP, mass-burn-fraction point (CA50 point), and engine pumping mean-effective-pressure (PMEP), which relates to fuel reforming. The IMEP may be controlled by controlling energy input to each cylinder by controlling engine fueling in the form of one or a plurality of fuel pulsewidths (FPW). The mass-burn-fraction point (CA50 point) is closely related to combustion stability. Combustion stability can be achieved by controlling the mass-burn-fraction point (CA50 point) to a preferred value for all of the cylinders, regardless of the magnitude of fuel reforming and PMEP.

Figures 1, 3:
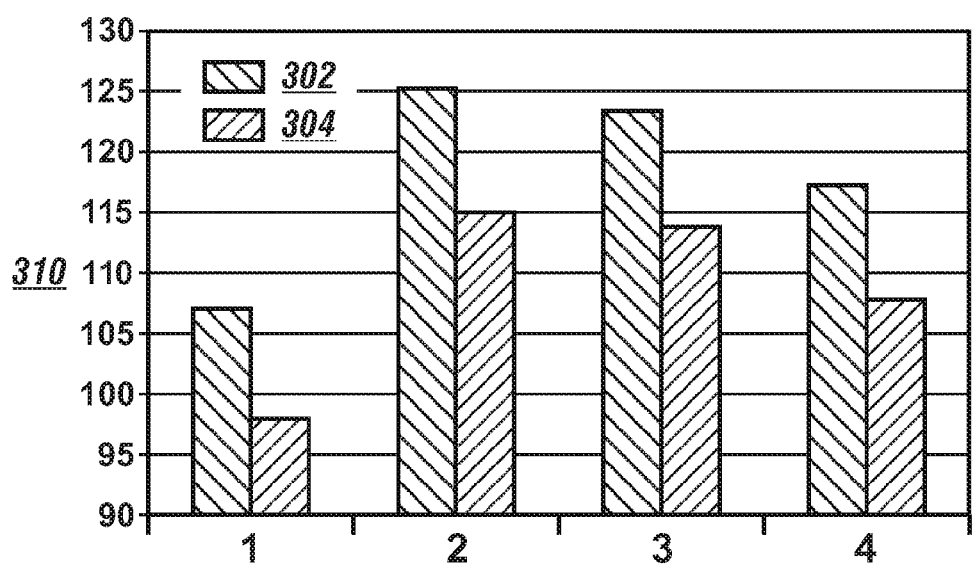
Figures 2, 3:
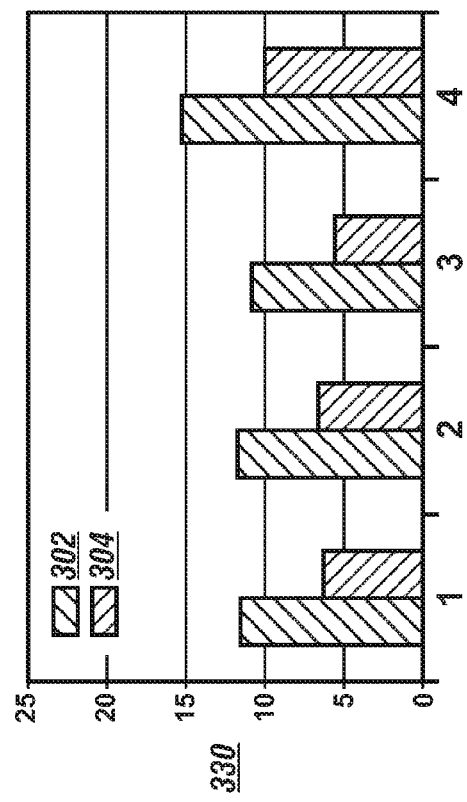
Figure 3:
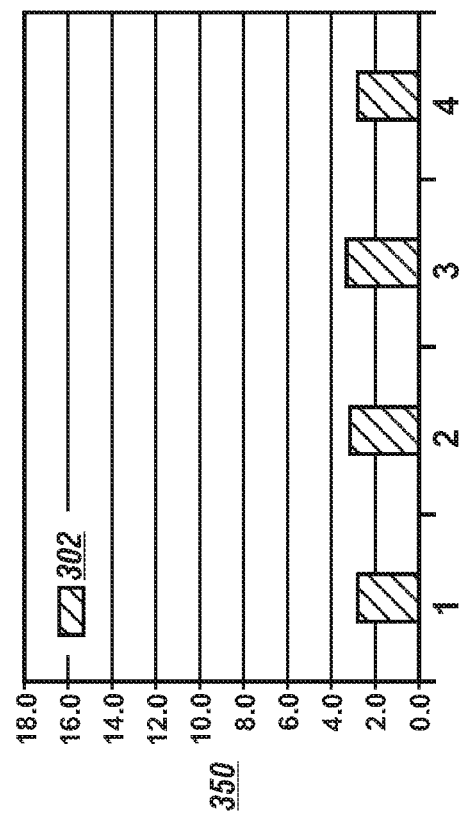
Figures 3, 4:
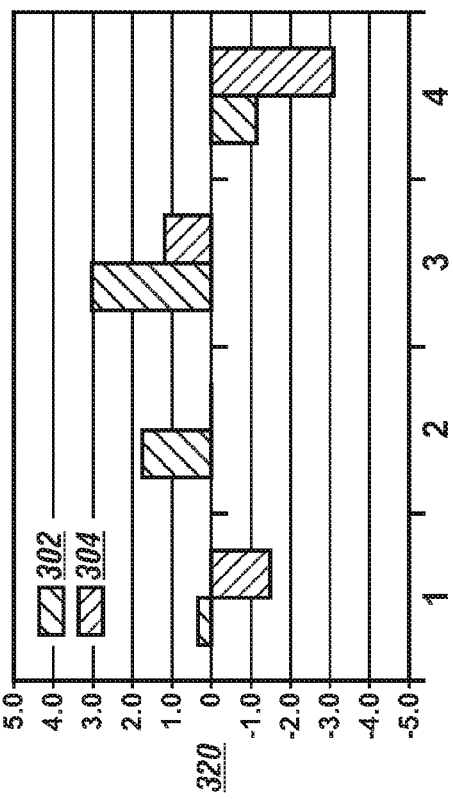
Figures 3, 4, 5:
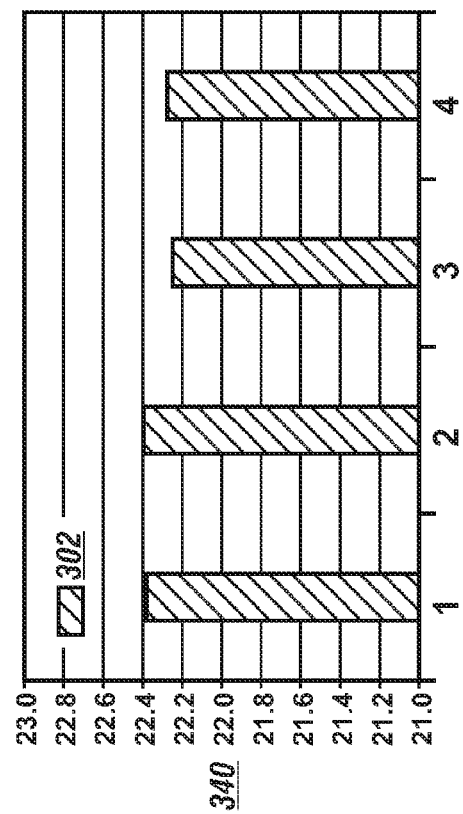
Figures 1, 4:
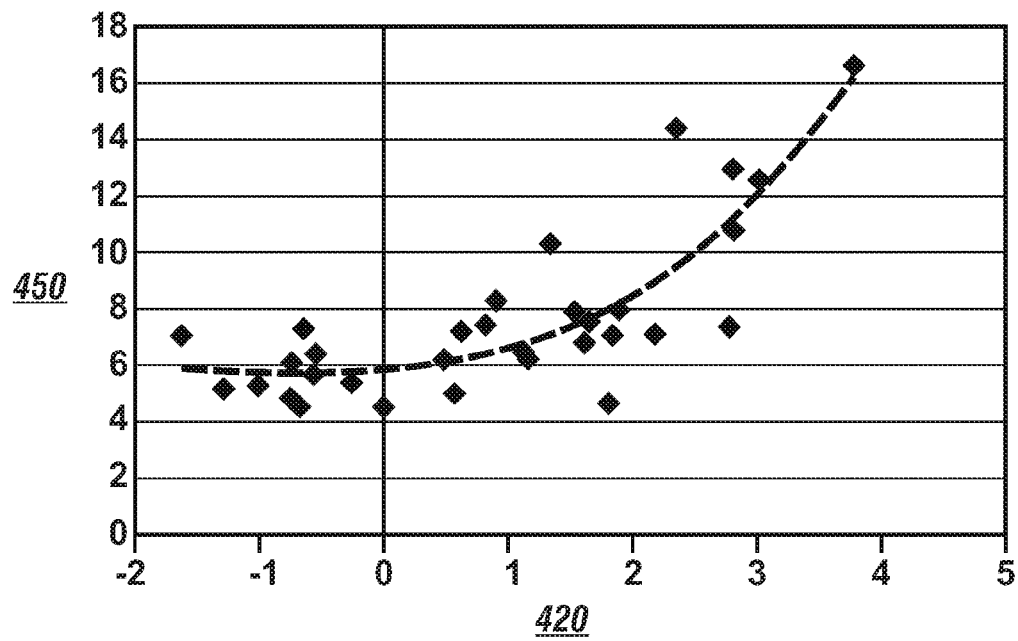
Figures 2, 4:
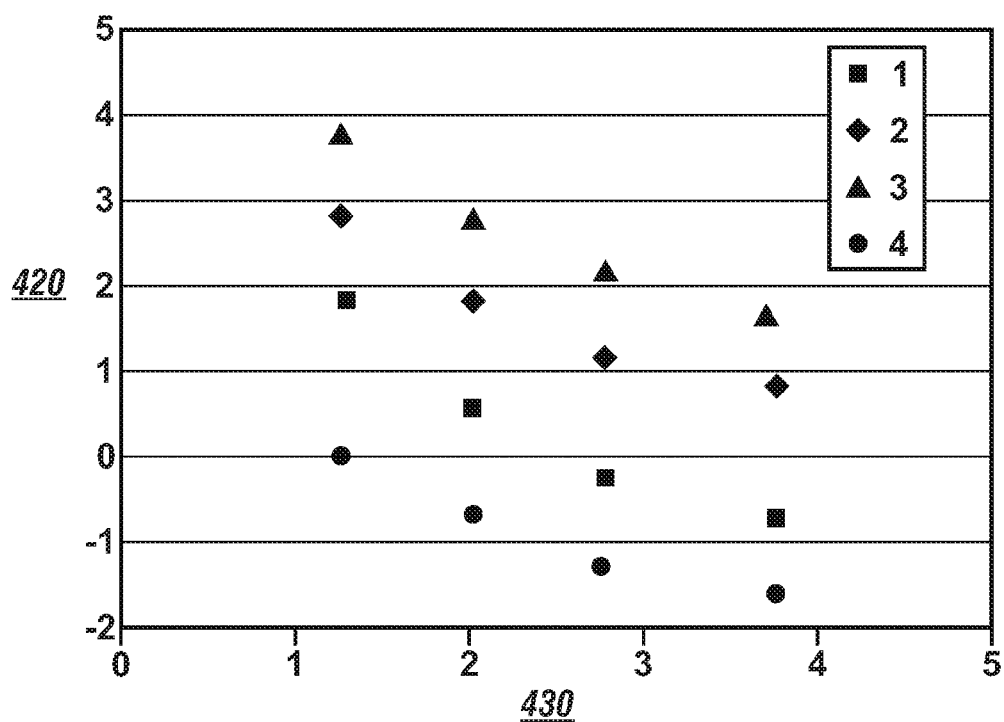
Figure 5:
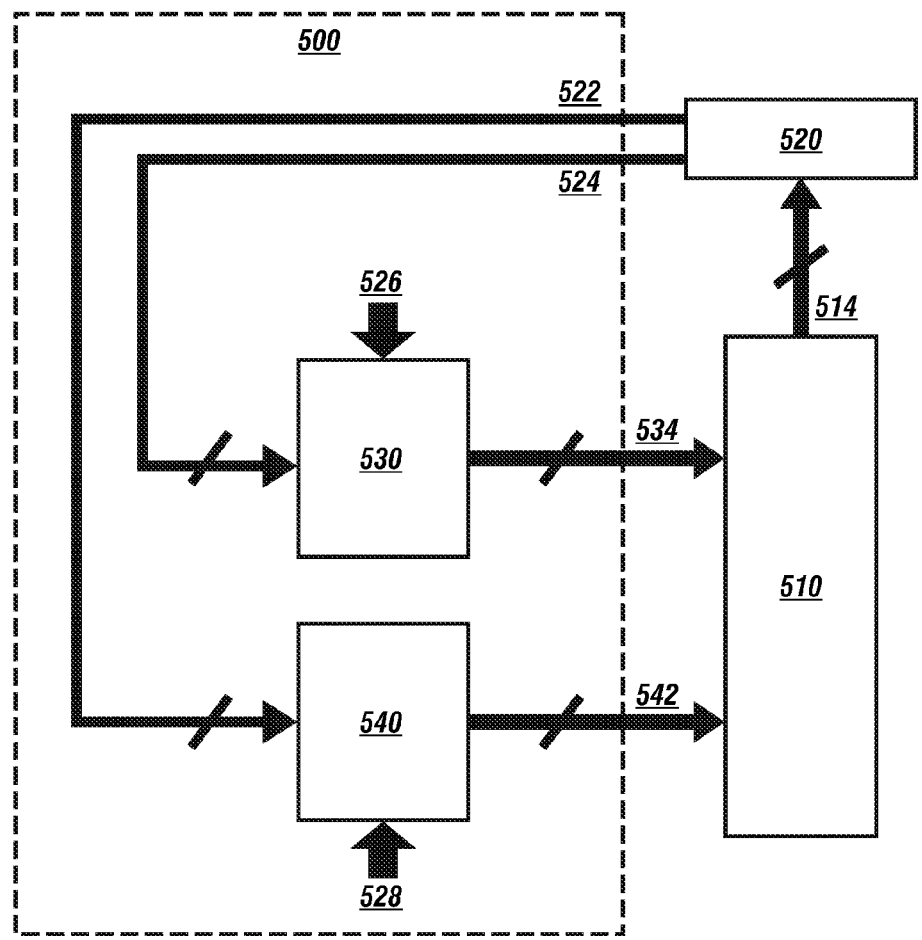

FIGS. 3-1, 3-2, 3-3, 3-4 and 3-5 graphically show several of the aforementioned combustion parameters during operation of the exemplary four-cylinder engine of FIG. 1 while operating in the mixed combustion mode at operating conditions that include engine speed of 1000 RPM and engine load at 0.4 bar (brake mean-effective pressure or BMEP). The results are related to operating the four-cylinder engine without benefit of the combustion stability control routine 500 described herein. FIG. 3-1 shows indicated mean-effective-pressure (IMEP) (kPa) 310 for each of cylinders 1, 2, 3, and 4 during operation as measured using a first cylinder pressure monitoring system 302 and a second cylinder pressure monitoring system 304. FIG. 3-2 shows corresponding mass-burn-fraction points, i.e., a CA50 point (deg-aTDC) 320 for each of the cylinders 1, 2, 3 and 4 during the same operation. The plotted data is shown relative to a nominal CA50 point determined using the first cylinder pressure monitoring system 302 and the second cylinder pressure monitoring system 304. FIG. 3-3 shows corresponding engine pumping mean-effective-pressure (PMEP) (kPa) 330 for each of the cylinders 1, 2, 3 and 4 during the same operation. The plotted data is determined using the first cylinder pressure monitoring system 302 and the second cylinder pressure monitoring system 304. FIG. 3-4 shows corresponding engine air/fuel ratio 340 for each of the cylinders 1, 2, 3 and 4 during the same operation. Again as shown, there is a wide range of variation in air/fuel ratio between the cylinders. FIG. 3-5 shows corresponding combustion stability for the engine as indicated by a coefficient of variation of the IMEP (COV-IMEP) (%) 350. As indicated by the results shown in these figures, cylinders 1, 2, 3 and 4 show different magnitudes of IMEP, mass-burn-fraction points, PMEP, air/fuel ratio and COV-IMEP, with the different magnitudes attributable to injector-by-injector flow variation, variation in amount of fuel reforming, differing in-cylinder thermal conditions and non-uniform distribution of air flow between the cylinders. Such conditions can cause engine instability that is perceived by a vehicle operator as a rough engine idle condition. The engine instability may also cause increased NOx emissions during cold engine operation.

FIGS. 4-1 and 4-2 show evaluations of the data of FIGS. 3-1, 3-2, 3-3, 3-4 and 3-5. FIG. 4-1 shows mass-burn-fraction points (deg aTDC) 420 on the x-axis plotted in relation to the COV-IMEP (%) 450 on the y-axis. FIG. 4-2 shows the PMEP (kPa) 430 on the x-axis plotted in relation to the mass-burn-fraction points (deg aTDC) 420 for each of the cylinders 1, 2, 3 and 4.

The results shown with reference to FIGS. 3 and 4 indicate that the critical combustion parameters related to combustion stability during engine operation at low load engine operation include air/fuel ratio, IMEP, PMEP and a mass-burn-fraction point. The IMEP is controllable by controlling fuel energy to each of the cylinders, i.e., by controlling engine fueling through control of cylinder fuel pulsewidth (FPW). The mass-burn-fraction point relates to combustion stability. Engine control that includes maintaining the mass-burn-fraction points (CA50 points) of all the cylinders at a uniform level regardless of the amount of fuel reforming (indicated by PMEP level) can result in desirable combustion stability. As the amount of fuel reforming increases as indicated by the PMEP, the CA50 point advances. Thus, a different amount of fuel reforming may be required in different ones of the cylinders in order to achieve a uniform CA50 point in all the cylinders. Thus, in order to control the cylinders to achieve a uniform CA50 point, fueling during fuel reforming is controlled, including controlling an end-of-injection point of an initial fuel injection event (EOM that occurs during the fuel reforming prior to an initial spark ignition event.

FIG. 5 is a schematic diagram of a combustion stability control routine 500 for controlling operation of an embodiment of the multi-cylinder internal combustion engine 510 of FIG. 1 to achieve combustion stability during engine operation, including engine operation in the mixed combustion mode at low load conditions. The combustion stability control routine 500 is executed to control operation of the engine 510, and includes an individual cylinder fuel controller 530 and an individual cylinder mass-burn-fraction point controller 540. Overall, the combustion stability control routine 500 includes determining a parameter associated with combustion pressure in each of the cylinders during each combustion event. A target state for the combustion pressure parameters is determined for each of the cylinders and fuel pulsewidth is controlled for each of the cylinders responsive to the target state for the combustion pressure parameter for the corresponding cylinder. At the same time, a uniform target mass-burn-fraction point is determined for the cylinders and an end-of-injection timing and a corresponding spark ignition timing are controlled for the cylinders responsive to the target mass-burn-fraction point for the engine. Preferably, there is a target IMEP point 526 and a target mass-burn-fraction point, e.g., a CA50 point 528 associated with each engine operating point including during operation in the mixed combustion mode. In operation, an individual cylinder pressure processing unit 520 monitors the in-cylinder pressures 514 from each of the plurality of engine cylinders to determine mass-burn-fraction points, e.g., CA50 point 522 and IMEP 524 for each of the plurality of engine cylinders, with such determinations accomplished by suitable calculations, estimations, calibrations, or other known methods.

The individual cylinder fuel controller 530 monitors the states for IMEP 524 for each of the cylinders in relation to the target IMEP 526 and determines a fuel pulsewidth for each of the individual cylinders 534 based upon a difference between the target IMEP 526 and the monitored state for the IMEP 524 for the respective cylinder, with the fuel pulsewidth for each of the individual cylinders 534 employed to control operation of the engine 510.

The individual cylinder mass-burn-fraction point controller 540 determines the monitored CA50 point 522 for each of the cylinders in relation to the target CA50 point 528 and determines timings for end-of-injection and corresponding spark ignition events (EOI/Spk) 542 for each of the individual cylinders based upon a difference between the target CA50 point 528 and the monitored CA50 point 522 for the engine, with the timings for end-of-injection and corresponding spark ignition events (EOI/Spk) 542 for each of the individual cylinders employed to control operation of the engine 510 to achieve combustion stability as may be indicated by COV-IMEP.

Figure 6:
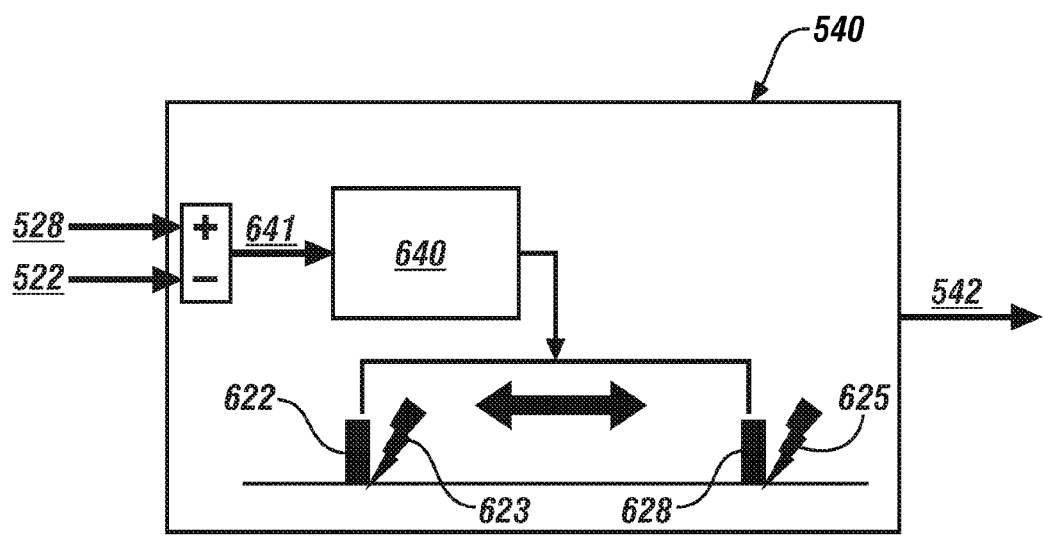
FIG. 6 illustrates a portion of the combustion stability control routine of FIG. 5 and including an embodiment of a cylinder-specific mass-burn-fraction point controller, in accordance with the disclosure.

FIG. 6 schematically shows a portion of an embodiment of the individual cylinder mass-burn-fraction point controller 540, which includes a plurality of cylinder-specific mass-burn-fraction point controllers 640, one of which is shown. Each of the cylinder-specific mass-burn-fraction point controllers 640 includes a calibration that adjusts timing of end-of-injections and corresponding spark ignition events (EOI/Spk) to adjust a mass-burn-fraction point, e.g., a CA50 point. This calibration includes an analytical process that retards initial and final fuel injection events and corresponding initial and final spark ignition events to retard the CA50 point, and advances initial and final fuel injection events and corresponding initial and final spark ignition events to advance the CA50 point. In operation, a CA50 error 641 is calculated and includes an arithmetically signed difference between the monitored CA50 point 522 for one of the cylinders in relation to the target CA50 point 528 for the respective cylinder. The CA50 error 641 is input to the cylinder-specific mass-burn-fraction point controller 640, which determines a control correction 642 for controlling initial fuel injection 622 in conjunction with an initial spark ignition event 623 and a final fuel injection 628 in conjunction with a final spark ignition event 625 for that cylinder charge for the selected cylinder. The control correction 642 preferably includes a magnitude of change in one of a timing advance or a timing retard, with the magnitude corresponding to the magnitude of the control correction 642 and the direction, i.e., one of advance or retard, depending upon a need to advance or retard the CA50 point for the specific cylinder to improve combustion stability in the engine.

Figure 7:
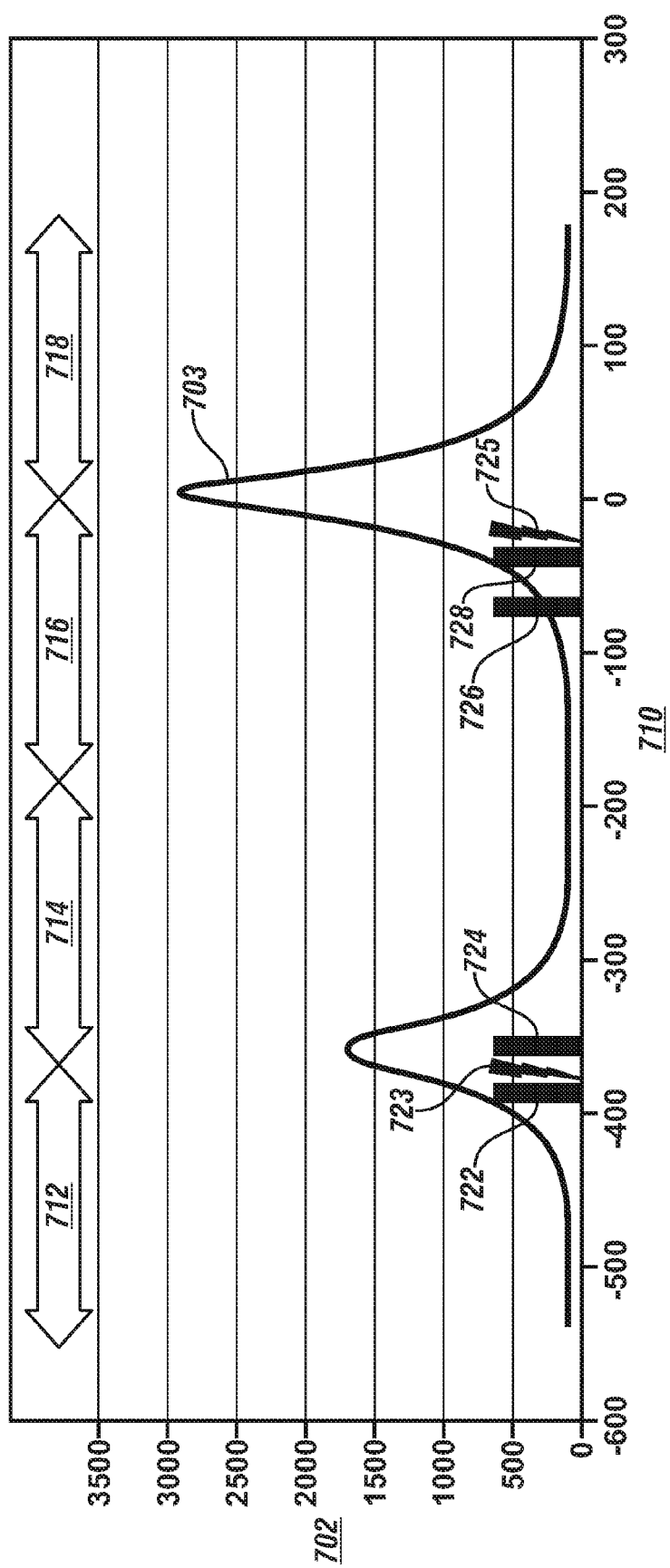
FIG. 7 illustrates cylinder pressure in relation to engine crank angle including a plot of in-cylinder pressure during one combustion cycle for one of the cylinders with the engine operating in the mixed combustion mode, in accordance with the disclosure.

FIG. 7 shows pressure (kPa) on the y-axis 702 in relation to engine crank angle (deg aTDC) on the x-axis 710 including a plot of in-cylinder pressure 703 during one combustion cycle for one of the cylinders associated with an exemplary embodiment of the engine 10 operating in the mixed combustion mode. One combustion cycle is depicted, including an exhaust stroke 712, an intake stroke 714, a compression stroke 716, and an expansion or power stroke 718 of the repetitively occurring combustion cycles. Plotted engine control parameters include an initial fuel injection 722, intermediate fuel injections 724 and 726, and a final fuel injection 728. Plotted engine control parameters further include an initial spark ignition event 723 and a final spark ignition event 725. One peak in the in-cylinder pressure 703 occurs during the transition between the exhaust stroke 712 and the intake stroke 714 as a result of exhaust recompression occurring during NVO, and facilitates fuel reforming in the cylinder. A second peak in the in-cylinder pressure 703 occurs at or near the transition between the compression stroke 716 and the power stroke 718 as a result of combustion of the cylinder charge. As shown the initial fuel injection 722, one of the intermediate fuel injections 724 and the initial spark ignition event 723 occur during the fuel reforming period, and one of the intermediate fuel injections 726, the final fuel injection 728 and the final spark ignition event 725 occur during the primary combustion period associated with the compression stroke 716 and power stroke 718.

The initial fuel injection 722 preferably occurs during the exhaust recompression period, as shown, and the corresponding initial spark ignition event 723 is initiated immediately subsequent to the end of the initial fuel injection 722 to effect fuel reforming. As described herein, magnitude of the initial fuel injection 722 and timings of the initial fuel injection 722 and the initial spark ignition event 723 are important to controlling fuel reforming and ultimately controlling engine stability. As shown there are two intermediate fuel injections 724 and 726. As is appreciated, there may be zero, one, two or more intermediate fuel injections that can occur during either or both the exhaust recompression period and the compression stroke. The intermediate fuel injection(s) may include a portion of fuel to effect fuel reforming. The intermediate fuel injection(s) may include a portion of a main fuel mass portion of the total required fuel mass per cycle to achieve a desired engine work output. The final fuel injection 728 preferably occurs during the compression stroke 716, as shown, and the corresponding final spark ignition event 725 is initiated subsequent thereto to effect combustion of the cylinder charge to generate power. As described herein, magnitude of the final fuel injection 728 and timings of the final fuel injection 726 and the final spark ignition event 725 are important to controlling engine work and output power.

The multiple fuel injection events enable a strategy wherein the initial fuel injection 722 and one of the intermediate fuel injections 724 cause a first portion of a total required fuel mass per cycle to be injected during exhaust recompression when the intake and exhaust valves are both closed and gas temperatures and cylinder pressures are high. The injected fuel goes through partial oxidation, i.e., a fuel reforming reaction, to produce extra heat for HCCI combustion that occurs during the power stroke 718. The low engine load conditions that lead to lower in-cylinder temperatures and fuel reforming during the exhaust recompression period may not be sufficient to trigger auto-ignition of the combustion charge at low speed and low load engine operation. At and near engine idle operation, the intermediate injection(s) 726 provides a mass of fuel in the compression stroke of the combustion cycle referred to as a flame propagation fuel injection event. The flame propagation fuel injection event is a stratified, spray-guided fuel injection event into the combustion chamber that is ignited by the second spark ignition event 725 to propagate a combustion wave that compresses the remaining fuel-air mixture in the combustion chamber 16 to effect auto-ignition of the combustion charge therein. The fuel mass burned during fuel reforming corresponds closely with combustion stability (COV-IMEP) and NOx emissions.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a multi-cylinder internal combustion engine through a combustion cycle comprising an exhaust stroke, an intake stroke, a compression stroke, and an expansion stroke, comprising:
   during engine load conditions insufficient to trigger auto-ignition, operating said engine in a mixed combustion mode comprising:
     controlling a throttle valve in a wide-open state,
     controlling intake and exhaust valves to achieve negative valve overlap, and
     executing multiple fueling injection events and multiple spark ignition events during each combustion cycle for each cylinder, wherein said multiple fueling injection events comprise an initial fueling injection event and a final fueling injection event, and said multiple spark ignition events comprise an initial spark ignition event and a final spark ignition event;
     during said negative valve overlap, executing said initial fueling injection event followed by said initial spark ignition event;
     during said compression stroke, executing said final fueling injection event followed by said final spark ignition event;
     determining IMEP and CA50 for each cylinder;
   controlling fueling for each cylinder responsive to a target IMEP for the cylinder, comprising:
     determining a target IMEP for each cylinder; and
     controlling fuel pulsewidth for each cylinder responsive to the target IMEP for the corresponding cylinder; and
   controlling end-of-injection timings and corresponding spark ignition timings for each cylinder responsive to a target CA50 associated with an engine operating point, comprising:
     determining a target CA50 for each cylinder;
     comparing the target CA50 to the CA50 for each cylinder;
     advancing end-of-injection timings and corresponding spark ignition timings for the corresponding cylinder when the comparison of the target CA50 to the CA50 for the corresponding cylinder indicates the CA50 lags the target CA50; and
     retarding end-of-injection timings and corresponding spark ignition timings for the corresponding cylinder when the comparison of the target CA50 to the CA50 for the corresponding cylinder indicates the CA50 leads the target CA50.

2. The method of claim 1, wherein the target CA50 for all cylinders is a uniform target CA50.

3. The method of claim 1, wherein said multiple fueling injection events for each of the cylinders during each combustion event deliver a total fuel mass to achieve a desired engine work output associated with the engine operating point.

4. The method of claim 1, wherein said multiple fueling injection events further comprise an intermediate fueling event executed subsequent to said initial spark ignition event and prior to said final fueling injection event.

5. The method of claim 4, wherein said intermediate fueling injection event is executed during said compression stroke.

6. The method of claim 1, wherein said multiple fueling injection events further comprise multiple intermediate fueling injection event executed subsequent to said initial spark ignition event and prior to said final fueling injection event.

7. The method of claim 6, wherein at least one of said multiple intermediate fueling injection events is executed during one of said negative valve overlap and said compression stroke.

8. An internal combustion engine, comprising:
   a combustion cylinder;
   a piston reciprocably disposed within the combustion cylinder;
   a throttle valve;
   a phase variable valve train including an intake valve and an exhaust valve;
   a direct-injection fuel injection system;
   a cylinder pressure sensor to detect pressure within the cylinder;
   a spark ignition system;
   a control system, comprising a processor and memory to:
     control the throttle valve wide open;
     control the valve train to a negative valve overlap period between closing of the exhaust valve and opening of the intake valve;
     receive the cylinder pressure from the cylinder pressure sensor and determine a CA50 point and IMEP based upon the cylinder pressure;
     control the direct-injection fuel injection system to control an initial fuel injection pulsewidth during the negative valve overlap period and to control a final fuel injection pulsewidth during a compression stroke of the piston, said initial and final injection pulsewidths based upon a comparison of IMEP to a target IMEP;

control the direct-injection fuel injection system to control the end of the initial fuel injection pulsewidth and to control the end of the final fuel injection pulsewidth, said ends of the initial and final injection pulsewidths based upon a comparison of CA50 to a target CA50; and control the spark ignition system to discharge after the initial fuel injection and to discharge after the final fuel injection.

9. The internal combustion engine of claim 8, wherein said control system further comprises the processor and memory to control the direct-injection fuel injection system to control an intermediate fuel injection pulsewidth subsequent to said initial fuel injection pulsewidth and prior to said final fuel injection pulsewidth.

10. The internal combustion engine of claim 9, wherein said intermediate fuel injection pulsewidth is executed during said compression stroke of the piston.

11. The method of claim 8, wherein said control system further comprises the processor and memory to control the direct-injection fuel injection system to control a plurality of intermediate fuel injection pulsewidths subsequent to said initial fuel injection pulsewidth and prior to said final fuel injection pulsewidth.

12. The method of claim 11, wherein at least one of said intermediate fuel injection pulsewidths is controlled during one of said negative valve overlap period and said compression stroke.

13. Method for operating a multi-cylinder internal combustion engine through a combustion cycle comprising an exhaust stroke, an intake stroke, a compression stroke, and an expansion stroke, comprising:

during engine load conditions insufficient to trigger auto-ignition, operating said engine in a mixed combustion mode comprising:
controlling a throttle valve in a wide-open state,
controlling intake and exhaust valves to achieve negative valve overlap, and
executing multiple fueling injection events and multiple spark ignition events during each combustion cycle for each cylinder, wherein said multiple fueling injection events comprise an initial fueling injection event and a final fueling injection event, and said multiple spark ignition events comprise an initial spark ignition event and a final spark ignition event;
during said negative valve overlap, executing said initial fueling injection event followed by said initial spark ignition event;
during said compression stroke, executing said final fueling injection event followed by said final spark ignition event;
during said negative valve overlap, executing an intermediate fueling injection event subsequent to said initial spark ignition event and prior to said final fueling injection event;
determining IMEP and CA50 for each cylinder;
controlling fueling for each cylinder responsive to a target IMEP for the cylinder, comprising:
determining a target IMEP for each cylinder; and
controlling fuel pulsewidth for each cylinder responsive to the target IMEP for the corresponding cylinder; and
controlling end-of-injection timings and corresponding spark ignition timings for each cylinder responsive to a target CA50 associated with an engine operating point, comprising:
determining a target CA50 for each cylinder;
comparing the target CA50 to the CA50 for each cylinder;
advancing end-of-injection timings and corresponding spark ignition timings for the corresponding cylinder when the comparison of the target CA50 to the CA50 for the corresponding cylinder indicates the CA50 lags the target CA50; and
retarding end-of-injection timings and corresponding spark ignition timings for the corresponding cylinder when the comparison of the target CA50 to the CA50 for the corresponding cylinder indicates the CA50 leads the target CA50.

14. Method for operating a multi-cylinder internal combustion engine through a combustion cycle comprising an exhaust stroke, an intake stroke, a compression stroke, and an expansion stroke, comprising:

during engine load conditions insufficient to trigger auto-ignition, operating said engine in a mixed combustion mode comprising:
controlling a throttle valve in a wide-open state,
controlling intake and exhaust valves to achieve negative valve overlap, and
executing multiple fueling injection events and multiple spark ignition events during each combustion cycle for each cylinder, wherein said multiple fueling injection events comprise an initial fueling injection event and a final fueling injection event, and said multiple spark ignition events comprise an initial spark ignition event and a final spark ignition event;
during said negative valve overlap, executing said initial fueling injection event followed by said initial spark ignition event;
during said compression stroke, executing said final fueling injection event followed by said final spark ignition event;
executing multiple intermediate fueling injection events subsequent to said initial spark ignition event and prior to said final fueling injection event, wherein at least one of said multiple intermediate fueling injection events is executed during said negative valve overlap;
determining IMEP and CA50 for each cylinder;
controlling fueling for each cylinder responsive to a target IMEP for the cylinder, comprising:
determining a target IMEP for each cylinder; and
controlling fuel pulsewidth for each cylinder responsive to the target IMEP for the corresponding cylinder; and
controlling end-of-injection timings and corresponding spark ignition timings for each cylinder responsive to a target CA50 associated with an engine operating point, comprising:
determining a target CA50 for each cylinder;
comparing the target CA50 to the CA50 for each cylinder;
advancing end-of-injection timings and corresponding spark ignition timings for the corresponding cylinder when the comparison of the target CA50 to the CA50 for the corresponding cylinder indicates the CA50 lags the target CA50; and
retarding end-of-injection timings and corresponding spark ignition timings for the corresponding cylinder when the comparison of the target CA50 to the CA50 for the corresponding cylinder indicates the CA50 leads the target CA50.

15. An internal combustion engine, comprising:
a combustion cylinder;
a piston reciprocably disposed within the combustion cylinder;
a throttle valve;
a phase variable valve train including an intake valve and an exhaust valve;
a direct-injection fuel injection system;
a cylinder pressure sensor to detect pressure within the cylinder;
a spark ignition system;
a control system, comprising a processor and memory to:
control the throttle valve wide open;
control the valve train to a negative valve overlap period between closing of the exhaust valve and opening of the intake valve;
receive the cylinder pressure from the cylinder pressure sensor and determine a CA50 point and IMEP based upon the cylinder pressure;
control the direct-injection fuel injection system to control an initial fuel injection pulsewidth during the negative valve overlap period and to control a final fuel injection pulsewidth during a compression stroke of the piston, said initial and final injection pulsewidths based upon a comparison of IMEP to a target IMEP;
control the direct-injection fuel injection system to control the end of the initial fuel injection pulsewidth and to control the end of the final fuel injection pulsewidth, said ends of the initial and final injection pulsewidths based upon a comparison of CA50 to a target CA50;
control the direct-injection fuel injection system to control an intermediate fuel injection pulsewidth subsequent to said initial fuel injection pulsewidth and prior to said final fuel injection pulsewidth during said negative valve overlap period; and
control the spark ignition system to discharge after the initial fuel injection and to discharge after the final fuel injection.

* * * * *